United States Patent
Kurihara

(10) Patent No.: US 8,001,840 B2
(45) Date of Patent: Aug. 23, 2011

(54) OSCILLATION TYPE GYRO SENSOR, CONTROL CIRCUIT, ELECTRONIC APPARATUS, AND METHOD OF MANUFACTURING AN OSCILLATION TYPE GYRO SENSOR

(75) Inventor: Kazuo Kurihara, Miyagi (JP)

(73) Assignee: Sony Corporation, Tokyo (JP)

( * ) Notice: Subject to any disclaimer, the term of this patent is extended or adjusted under 35 U.S.C. 154(b) by 537 days.

(21) Appl. No.: 12/046,635

(22) Filed: Mar. 12, 2008

(65) Prior Publication Data

US 2008/0223138 A1 Sep. 18, 2008

(30) Foreign Application Priority Data

Mar. 15, 2007 (JP) ................. 2007-066802

(51) Int. Cl.
*G01P 9/04* (2006.01)
*G01C 19/56* (2006.01)
(52) U.S. Cl. .................. 73/504.12; 73/504.15
(58) Field of Classification Search ............ 73/504.12, 73/504.15, 504.04, 504.16, 504.02
See application file for complete search history.

(56) References Cited

U.S. PATENT DOCUMENTS

| 5,675,083 A | * | 10/1997 | Nakamura | 73/504.12 |
| 5,794,080 A | * | 8/1998 | Watanabe et al. | 396/53 |
| 5,902,931 A | * | 5/1999 | Mori et al. | 73/504.12 |
| 6,564,638 B1 | * | 5/2003 | Ebara | 73/504.14 |
| 2008/0282800 A1 | * | 11/2008 | Kurihara | 73/504.15 |

FOREIGN PATENT DOCUMENTS

JP 09-292231 11/1997

* cited by examiner

*Primary Examiner* — Helen C. Kwok
(74) *Attorney, Agent, or Firm* — SNR Denton US LLP

(57) ABSTRACT

There is provided an oscillation type gyro sensor including an oscillation gyro device, an oscillation circuit, a controller, and an impedance conversion circuit. The oscillation gyro device includes a piezoelectric device including a drive electrode and a detection electrode, oscillates according to a drive signal input to the drive electrode, and is capable of generating an output signal including a detection signal corresponding to a Coriolis force from the detection electrode. The oscillation circuit outputs, based on the output signal, a signal for oscillating the oscillation gyro device to the drive electrode as the drive signal. The controller controls the oscillation circuit such that the oscillation circuit outputs a drive signal that makes the output signal constant. To the impedance conversion circuit, the drive signal output from the oscillation circuit is input.

8 Claims, 12 Drawing Sheets

OSCILLATION TYPE GYRO SENSOR, CONTROL CIRCUIT, ELECTRONIC APPARATUS, AND METHOD OF MANUFACTURING AN OSCILLATION TYPE GYRO SENSOR

CROSS REFERENCES TO RELATED APPLICATIONS

The present invention contains subject matter related to Japanese Patent Application JP 2007-066802 filed in the Japanese Patent Office on Mar. 15, 2007, the entire contents of which being incorporated herein by reference.

BACKGROUND OF THE INVENTION

1. Field of the Invention

The present invention relates to an oscillation type gyro sensor for detecting rotational angular velocity of an object, a control circuit thereof, an electronic apparatus mounted with the oscillation type gyro sensor, and a method of manufacturing an oscillation type gyro sensor.

2. Description of the Related Art

As commercially used angular velocity sensors, so-called oscillation type gyro sensors have been widely used. An oscillation type gyro sensor is a sensor having a cantilevered oscillator that oscillates at a predetermined resonance frequency and a piezoelectric element that detects the Coriolis force that occurs due to an influence of an angular velocity so as to detect the angular velocity.

An oscillation type gyro sensor has advantages of, for example, simple mechanism, short activation time, and low manufacturing cost. Oscillation type gyro sensors are mounted in electronic apparatuses such as video cameras, virtual reality devices, and car navigation systems for sensors that perform shake detection, motion detection, and direction detection, respectively.

In recent years, as electronic apparatuses in which an oscillation type gyro sensor is mounted have been downsized and have had improved functions, needs of downsizing and advanced functions of the oscillation type gyro sensors have become strong. For example, to satisfy the needs of multi-functions and downsizing of an electronic apparatus, an oscillation type gyro sensor is mounted on a single circuit board together with other sensors. To accomplish the downsizing of the electronic apparatus, a technique called the MEMS (Micro Electro Mechanical System) that forms a structure on an Si substrate using a thin film process and a photolithography technique for semiconductors has become common.

In the meantime, there has been a problem in that, depending on the environment in which the oscillation type gyro sensor is used, particularly depending on temperature, the characteristics of the oscillation type gyro sensor change.

To be specific, the oscillation type gyro sensor is driven by a constant drive signal which is set to have a value of a resonance frequency of an oscillator. In the case that the drive signal has a constant value, it is considered that detection sensitivity is to be constant regarding a configuration of a circuit of the oscillation type gyro sensor. However, due to the change of temperature, the detection sensitivity tends to change so as to be in proportion with the change of temperature.

To solve the problem as described above, there is disclosed an oscillation type gyro sensor provided with a circuit for allowing a detection signal output from a detection electrode of an oscillator to be constant (for example, see Japanese Patent Application Laid-Open No. Hei 9-292231, paragraphs 0023 and 0016, FIG. 1, hereinafter this document is referred to as Patent Document 1).

In Patent Document 1, two detection electrodes (16a, 16b) of an oscillator (12) output current signals. I-V converter circuits (24, 26) convert the current signals to voltage signals. An addition circuit (28) adds the voltage signals. An oscillation circuit (34) and a monitor circuit (40) control the signal output from the addition circuit (28) to be constant. In other words, the voltage of the drive signal output from an AGC (Automatic Gain Controller) circuit (38) is controlled such that the output signal voltage from the addition circuit (28) is always constant. As a result, even when characteristics of the oscillator (12) change depending on temperature, detection sensitivity can be kept constant.

SUMMARY OF THE INVENTION

Recently, however, an oscillation type gyro sensor is required to be further downsized and to have a much lower voltage. In the case that the oscillation type gyro sensor is downsized, an oscillator thereof is similarly downsized and made light. A Coriolis force is in proportion with weight of an oscillation system. So in the case that the oscillator is made light, the detection sensitivity is deteriorated by that amount. Thus, it is required to provide an oscillation type gyro sensor with enhanced detection sensitivity and improved reliability.

In view of the above, there is a need for a technique involving an oscillation type gyro sensor providing improved reliability.

According to an embodiment of the present invention, there is provided an oscillation type gyro sensor including an oscillation gyro device, an oscillation circuit, a controller, and an impedance conversion circuit. The oscillation gyro device includes a piezoelectric device including a drive electrode and a detection electrode, oscillates according to a drive signal input to the drive electrode, and is capable of generating an output signal including a detection signal corresponding to a Coriolis force from the detection electrode. The oscillation circuit outputs, based on the output signal, a signal for oscillating the oscillation gyro device to the drive electrode as the drive signal. The controller controls the oscillation circuit such that the oscillation circuit outputs a drive signal that makes the output signal constant. To the impedance conversion circuit, the drive signal output from the oscillation circuit is input.

For example, it is only necessary that when the oscillation type gyro sensor is manufactured or prior to the shipment thereof, the drive signal output from the oscillation circuit is monitored via the impedance conversion circuit. Since the drive signal is monitored, the optimum sharpness (Qm) value of the oscillation gyro device can be observed. Accordingly, a designer will be able to design an oscillation type gyro sensor with improved reliability with reference to the measured sharpness Qm in the future.

Further, the oscillation gyro device includes a piezoelectric member. In the case that an electrode terminal for monitoring the drive signal is directly connected to an output terminal of the oscillation circuit, there is a fear that the piezoelectric member may be damaged by electrostatic discharge or polarization fluctuates due to electric discharge. According to the present invention, however, a probe or the like only needs to be connected to the output terminal of the oscillation circuit via the impedance conversion circuit, so the above-mentioned fear is eliminated.

In addition, according to the embodiment of the present invention, the oscillation circuit outputs a drive signal so as to control the output signal to be constant. So higher detection sensitivity that does not depend on temperature characteristics of the oscillation gyro device can be attained.

According to the embodiment of the present invention, for example, the detection electrode includes a first detection electrode generating a first signal and a second detection electrode generating a second signal, a difference of the first signal and the second signal being used to obtain the detection signal. The oscillation type gyro sensor further comprises an addition circuit adding the first signal from the first detection electrode and the second signal from the second detection electrode. The oscillation circuit outputs, based on the signal obtained by the addition in the addition circuit, the drive signal to the drive electrode.

According to the embodiment of the present invention, the oscillation gyro device includes an oscillation arm mounted with the piezoelectric device, and a base body. The base body includes a lead electrode group connecting the drive electrode and the detection electrode to an outside of the oscillation type gyro sensor and supporting the oscillation arm.

According to the embodiment of the present invention, specifically, the piezoelectric device includes a piezoelectric film having a first surface on which the drive electrode and the detection electrode are formed and a second surface on a side opposite to the first surface, and a common electrode formed on the second surface. The oscillation arm includes an arm base made of a semiconductor, which is mounted with the piezoelectric device such that the common electrode is provided between the arm base and the piezoelectric film. In other words, according to this embodiment, a plurality of oscillation gyro devices can be manufactured on one semiconductor substrate by a method such as the MEMS. A downsized oscillation gyro device can thus be manufactured.

Alternatively, according to another embodiment of the present invention, there is provided an oscillation type gyro sensor including an oscillation gyro device, an oscillation circuit, a controller, and an impedance conversion circuit. The oscillation gyro device includes a first oscillation arm including a first piezoelectric device having a first drive electrode and detection electrodes, a second oscillation arm including a second piezoelectric device having a second drive electrode, and a third oscillation arm including a third piezoelectric device having a third drive electrode. The oscillation gyro device oscillates according to a drive signal input to each of the first drive electrode, the second drive electrode, and the third drive electrode and is capable of generating an output signal including a detection signal corresponding to a Coriolis force from the detection electrodes. The oscillation circuit outputs, based on the output signal, a signal for oscillating the oscillation gyro device to each of the first drive electrode, the second drive electrode, and the third drive electrode as the drive signal. The controller controls the oscillation circuit such that the oscillation circuit outputs a drive signal that makes the output signal constant. To the impedance conversion circuit, the drive signal output from the oscillation circuit is input.

According to another embodiment of the present invention, there is provided a control circuit for an oscillation type gyro sensor. The control circuit includes an oscillation gyro device. The oscillation gyro device includes a piezoelectric device including a drive electrode and a detection electrode. The oscillation gyro device oscillates according to a drive signal input to the drive electrode. The oscillation gyro device is capable of generating an output signal including a detection signal corresponding to a Coriolis force from the detection electrode. The control circuit includes an oscillation circuit, a controller, and an impedance conversion circuit. The oscillation circuit outputs, based on the output signal, a signal for oscillating the oscillation gyro device to the drive electrode as the drive signal. The controller controls the oscillation circuit such that the oscillation circuit outputs a drive signal that makes the output signal constant. To the impedance conversion circuit, the drive signal output from the oscillation circuit is input.

According to another embodiment of the present invention, there is provided an electronic apparatus including a case and an oscillation type gyro sensor. The oscillation type gyro sensor is mounted inside the case, and includes an oscillation gyro device, an oscillation circuit, a controller, and an impedance conversion circuit. The oscillation gyro device includes a piezoelectric member, a drive electrode driving the piezoelectric member, and a detection electrode. The detection electrode outputs, when a Coriolis force is generated in the piezoelectric member, an output signal including a detection signal corresponding to the Coriolis force. The oscillation circuit outputs, based on the output signal, a signal oscillating the oscillation gyro device to the drive electrode as the drive signal. The controller controls the oscillation circuit such that the oscillation circuit outputs a drive signal that makes the output signal is constant. To the impedance conversion circuit, the drive signal output from the oscillation circuit is input.

According to another embodiment of the present invention, there is provided a manufacturing method for an oscillation type gyro sensor. The oscillation type gyro sensor includes an oscillation gyro device including a piezoelectric device including a drive electrode and a detection electrode. The oscillation type gyro sensor oscillates according to a drive signal input to the drive electrode. The oscillation type gyro sensor is capable of generating an output signal including a detection signal corresponding to a Coriolis force from the detection electrode. The manufacturing method includes electrically connecting a control circuit and the oscillation gyro device, outputting the drive signal from the oscillation circuit of the control circuit to drive the oscillation gyro device, and monitoring the drive signal output from the impedance conversion circuit of the control circuit. The control circuit includes an oscillation circuit, a controller, and an impedance conversion circuit. The oscillation circuit outputs, based on the output signal, a signal for oscillating the oscillation gyro device to the drive electrode as the drive signal. The controller controls the oscillation circuit such that the oscillation circuit outputs a drive signal that makes the output signal is constant. To the impedance conversion circuit, the drive signal output from the oscillation circuit is input.

According to this embodiment, since the drive signal is monitored, the optimum sharpness Qm value of the oscillation gyro device can be measured. A designer will thus be able to design an oscillation type gyro sensor with improved reliability with reference to the sharpness Qm in the future.

As described above, according to the embodiments of the present invention, an oscillation type gyro sensor with enhanced detection sensitivity and improved reliability can be obtained.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the accompanying drawings.

Figure 1A:
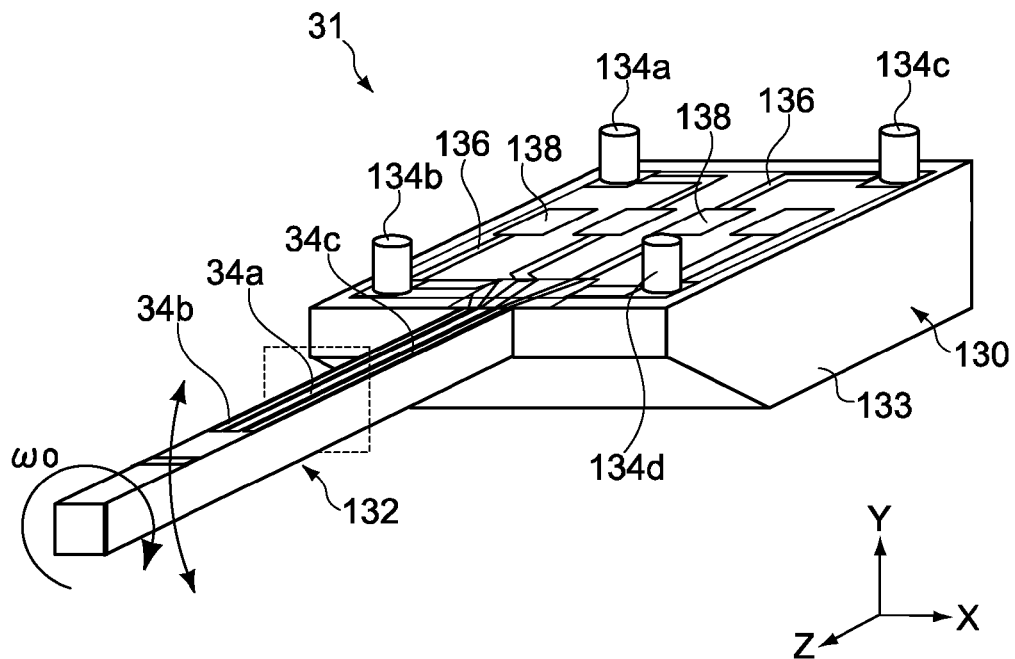
FIG. 1A is a perspective view showing an oscillation gyro device according to an embodiment of the present invention.

FIG. 1A is a perspective view showing an oscillation gyro device according to an embodiment of the present invention.

Figure 1B:
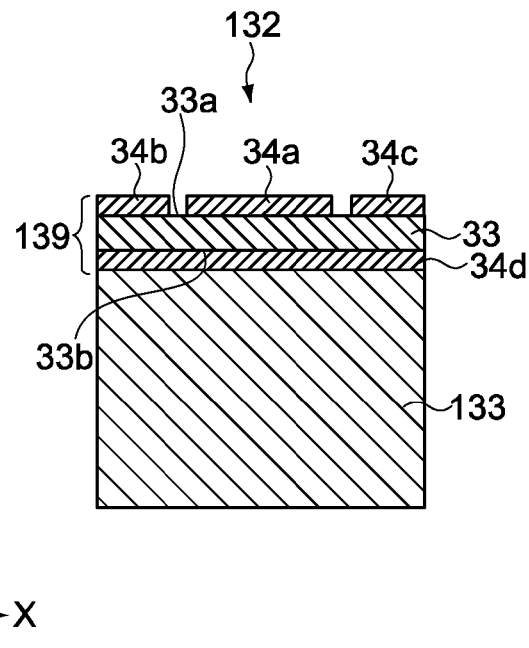
FIG. 1B is a cross-sectional view of an oscillation arm of the oscillation gyro device shown in FIG. 1A, taken along a plane orthogonal to Z axis.

The oscillation gyro device, denoted by reference numeral 31, includes a base body 130 and an oscillation arm 132. The oscillation arm 132 is provided such that the oscillation arm 132 extends from the base body 130 and is capable of oscillating. FIG. 1B is a cross-sectional view of the oscillation arm 132, taken along a plane orthogonal to a longitudinal axis of the oscillation arm, i.e., Z axis.

The oscillation gyro device 31 includes an arm base 133 and a piezoelectric element 139. The arm base 133 is a semiconductor made of, for example, silicon. The piezoelectric element 139 is provided on the arm base 133. The oscillation gyro device 31 is typically manufactured by the MEMS. For example, as shown in FIG. 1B, a conductive film serving as a common electrode 34d is formed on a portion corresponding to the arm base 133, e.g., a silicon substrate. In addition, a piezoelectric film 33 is formed on the conductive film, i.e., the common electrode 34d. A drive electrode 34a, a first detection electrode 34b, and a second detection electrode 34c are formed on a first surface 33a. The first surface 33a is an upper surface of the piezoelectric film 33. Each of the drive electrode 34a, the first detection electrode 34b, and the second detection electrode 34c has a predetermined elongated shape. The common electrode 34d is formed on a second surface 33b. The second surface 33b is a lower surface of the piezoelectric film 33, which is opposite to the first surface 33a.

A lead electrode is formed on the base body 130. The lead electrode includes lead wires 136, electrode pads 138, and bumps 134a to 134d. The bump 134a is connected to the drive electrode 34a. The bump 134b is connected to the first detection electrode 34b. The bump 134c is connected to the second detection electrode 34c. The bump 134d is connected to the common electrode 34d. Via the bumps 134a to 134d, the drive electrode 34a, the first detection electrode 34b, the second detection electrode 34c, and the common electrode 34d are connected to an outside of the oscillation gyro device 31. That is, the drive electrode 34a, the first detection electrode 34b, the second detection electrode 34c, and the common electrode 34d are connected to a control circuit such as an IC (control circuit 50 shown in FIG. 4 which will be described later). The bumps 134a to 134d are made of, but not limited to, gold.

The drive electrode 34a, the first detection electrode 34b, the second detection electrode 34c, the lead wires 136, and so forth are thus formed. Then, the oscillation gyro device 31 having a shape shown in FIG. 1A is cut out from a silicon wafer.

Figure 2:
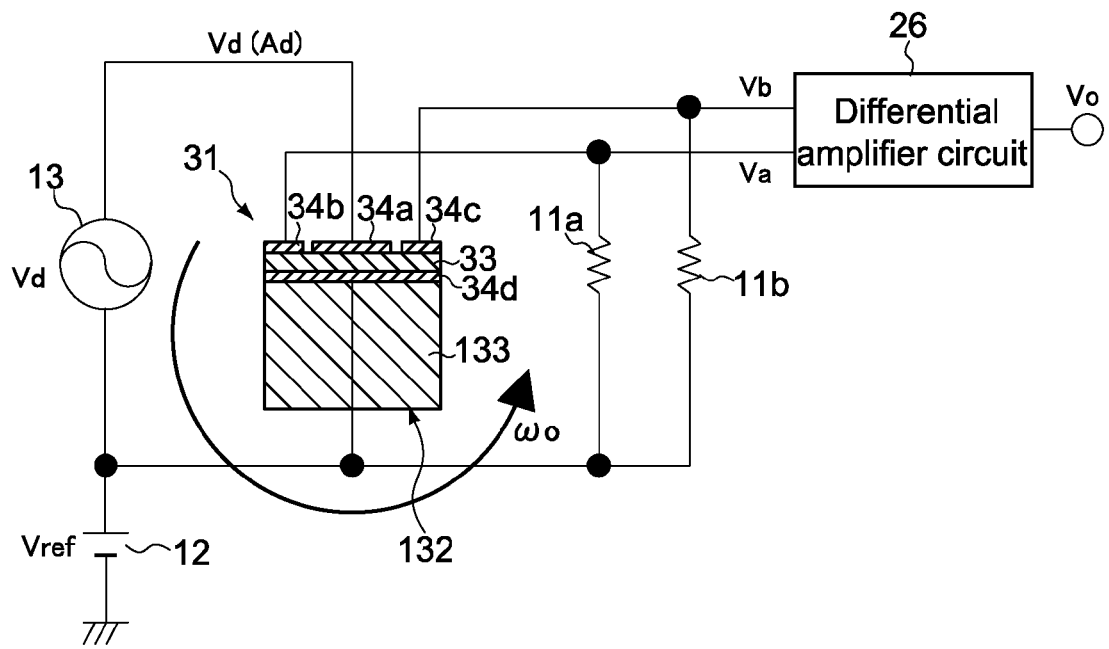
FIG. 2 is a diagram illustrating a principle of operation of an oscillation type gyro sensor including the oscillation gyro device shown in FIG. 1A.
Figure 2:
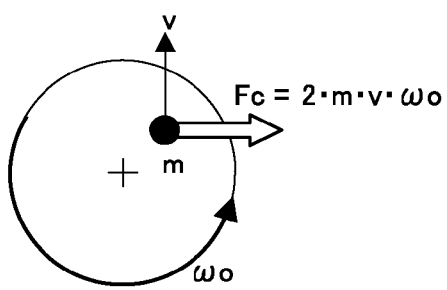

FIG. 2 is a diagram illustrating a principle of operation of an oscillation type gyro sensor including the oscillation gyro device 31 shown in FIG. 1A.

The common electrode 34d of the oscillation gyro device 31 is connected to a DC power source 12. An AC power source 13 is connected between the drive electrode 34a and the common electrode 34d. A resistor 11a is connected between the first detection electrode 34b and the common electrode 34d. A resistor 11b is connected between the second detection electrode 34c and the common electrode 34d. The first detection electrode 34b and the second detection electrode 34c are connected to a differential amplifier circuit 26.

The drive electrode 34a is biased by the DC power source 12 so as to have a voltage value Vref. The common electrode 34d is also biased by the DC power source 12 so as to have the voltage value Vref. The first detection electrode 34b is biased to have the voltage value Vref via the resistor 11a. The second detection electrode 34c is biased to have the voltage value Vref via the resistor 11b. That is, the difference of the DC voltage value of the first surface of the piezoelectric film 33 and the DC voltage value of the second surface thereof is zero. In addition, the AC power source 13 applies a drive voltage signal Vd between the first surface and the second surface of the piezoelectric film 33 via the drive electrode 34a and the common electrode 34d. The drive voltage signal Vd is based on the DC voltage value Vref being a reference. The drive voltage signal Vd is converted to a mechanical movement of the piezoelectric film 33. Accordingly, the oscillation arm 132 performs flexion movement in the Y direction.

The flexion movement is electrically converted in the piezoelectric film 33. Specifically, the first detection electrode 34b outputs an AC voltage signal Va, and the second voltage electrode 34c outputs an AC voltage signal Vb.

In the case that rotational angular velocity ω about the longitudinal axis (Z axis) of the oscillation arm 132 is not applied to the oscillation arm 132, the signal output from the first detection electrode 34b and the signal output from the second detection electrode 34c have the same phase and the same value. The detection signals are thus offset in the differential amplifier circuit 26.

In the case that the rotational angular velocity ωo about the longitudinal axis of the oscillation arm 132 is applied to the oscillation arm 132, owing to the Coriolis force generated in the X axis direction, the direction of the flexion movement changes. As a result, a difference is caused between the value of the output signal of the first detection electrode 34b and the value of the output signal of the second detection electrode 34c. When the output signals are input to the differential amplifier circuit 26, a differential signal Vo, i.e., a detection signal, is obtained.

In the case that mass of the oscillation arm 132 is represented by m, oscillation velocity of the flexion movement of the oscillation arm 132, v, the rotational angular velocity about the longitudinal axis of the oscillation arm 132, ωo, the Coriolis force represented by Fc is expressed by Equation (1) (refer to FIG. 2).

$$Fc = 2*m*x*v*\omega o \quad (1)$$

It should be noted that hereinafter the symbol "*" in equations represents multiplication.

The Coriolis force Fc is in proportion with the differential signal Vo obtained in the differential amplifier circuit 26. In the case that a proportionality constant is represented by k1, the differential signal Vo is expressed by Equation (2).

$$Vo = k1*2*m*v*\omega o \quad (2)$$

In order to enhance detection sensitivity, it can be seen from Equation (2) that the mass m and the velocity v only need to have larger values. However, the mass m having a larger value is inappropriate herein, because in such a case, it is difficult to downsize the oscillation gyro device 31. Accordingly, the velocity v having a larger value is appropriate in this situation. In the case that an oscillation amplitude is represented by Av, an oscillation frequency, fv, and a proportionality constant, k2, the velocity v is expressed by Equation (3).

$$v = k2*Av*fv \quad (3)$$

The oscillation frequency fv depends on the shape of the oscillation arm 132. The oscillation frequency fv, however, cannot be arbitrarily determined since it is restricted by an electronic apparatus or the like to which the oscillation gyro device 31 is mounted. In the case that a voltage amplitude of the drive signal Vd is represented by Ad, sharpness of the oscillation arm 132, Qm, a proportionality constant, k3, the oscillation amplitude Av is expressed by Equation (4).

$$Av = k3*Ad*Qm \quad (4)$$

Equation (5) is derived from the above Equations (2) to (4).

$$Vo = k*Ad*Qm*\omega o \quad (5)$$

$$K = k1*k2*k3*2*m*fv$$

Accordingly, in order to enhance the detection sensitivity without increasing the mass m and the oscillation frequency fv, it can be seen that the voltage amplitude Ad of the drive signal and the sharpness Qm of the oscillation arm only need to be increased. In order to increase the voltage amplitude Ad of the drive signal Vd, an output dynamic range of the drive circuit is increased. However, the increase in the output dynamic range is inappropriate herein, because in such a case, it is difficult to lower the voltage of the oscillation type gyro sensor. In addition, the sharpness Qm of the oscillation arm 132 mainly depends on the characteristics of the piezoelectric film 33 of the oscillation gyro device 31.

Figure 3:
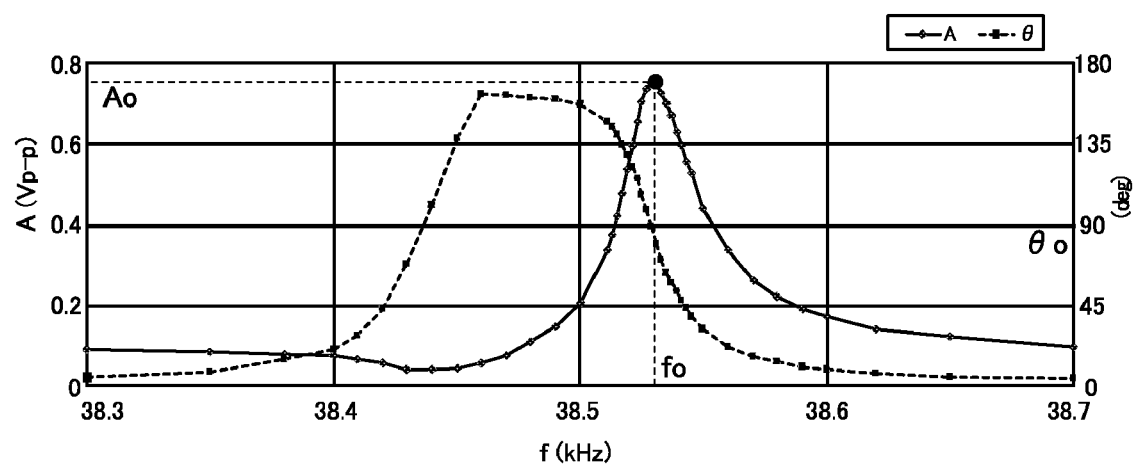
FIG. 3 is a graph showing input/output characteristics of the oscillation gyro device shown in FIG. 2.

FIG. 3 is a graph showing the input/output characteristics of the oscillation gyro device 31 shown in FIG. 2. The voltage amplitude Ad of the drive signal Vd input to the oscillation gyro device 31 is set to 1.1 Vp-p, and the AC voltage signal Va output from the first detection electrode 34b and the AC voltage signal Vb output from the second detection electrode 34c are measured. The abscissa axis represents a resonance frequency f of the drive signal Vd, the ordinate axes represent a voltage amplitude A of the output AC voltage signal Va and the output AC voltage signal Vb, and a phase θ of the output AC voltage signal Va and the output AC voltage signal Vb, respectively.

The oscillation gyro device 31 operates at a frequency fo with which input/output is most efficiently performed and with which the voltage amplitude A has the largest value Ao. At the frequency fo, the voltage amplitude A (Ao) is approximately 0.75 Vp-p and the phase θ is approximately 90 deg. The sharpness Qm of the oscillation arm 132 is correlated with the largest voltage amplitude Ao (the largest voltage of the detection signal (output signal)). As the sharpness Qm increases, the largest voltage amplitude Ao increases. Accordingly, in order to control the sharpness Qm, the largest voltage amplitude Ao only needs to be monitored.

Subsequently, an oscillation type gyro sensor including a circuit capable of monitoring the largest voltage amplitude Ao will be described. After that, an oscillation type gyro sensor according to another embodiment of the present invention will be described referring to FIG. 7.

Figure 4:
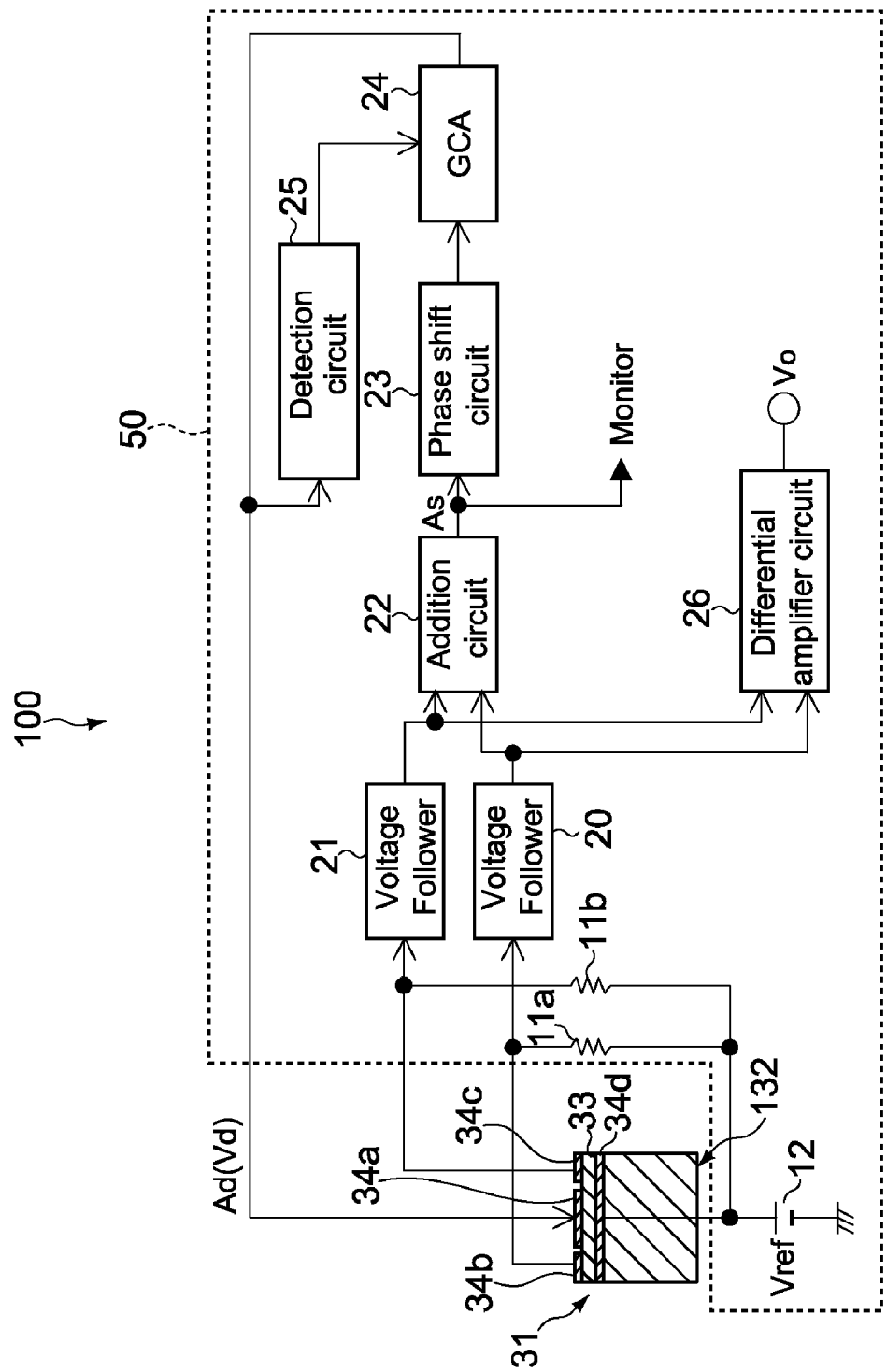
FIG. 4 is a block diagram showing a configuration of the oscillation type gyro sensor including the oscillation gyro device.

FIG. 4 is a block diagram showing a configuration of the oscillation type gyro sensor of this type.

The oscillation type gyro sensor, denoted by reference numeral 100, includes the oscillation gyro device 31 shown in FIG. 1A and FIG. 1B, and a control circuit 50. The control circuit 50 drives the oscillation gyro device 31.

The output signal of the first detection electrode 34b of the oscillation gyro device 31 is input to a voltage follower 20. The output signal of the second detection electrode 34c of the oscillation gyro device 31 is input to a voltage follower 21. The output signal of the voltage follower 20 is input to an addition circuit 22 and the differential amplifier circuit 26. The output signal of the voltage follower 21 is input to the addition circuit 22 and the differential amplifier circuit 26. Each of the voltage followers 20 and 21 serves as an impedance conversion circuit functioning to separate the oscillation gyro device 31 and the control circuit 50 in terms of impedance.

The output signal of the addition circuit 22 is input to a phase shift circuit 23. The phase shift circuit 23 delays the received input signal by 90 deg to output the signal delayed by 90 deg. The output signal of the phase shift circuit 23 is input to a GCA (Gain Control Amplifier) 24. A detection circuit 25 detects the voltage amplitude of the drive signal. The GCA 24 feeds back the voltage amplitude detected by the detection circuit 25 to control the amplification degree. The output signal of the GCA 24 is input to the detection circuit 25 and to the drive electrode 34a of the oscillation gyro device 31. The output signal of the detection circuit 25 is input to the GCA 24. The addition circuit 22 cancels the change of the detection signal when the rotational angular velocity ωo about the longitudinal axis of the oscillation arm 132 (Z axis) is applied to the oscillation arm 132.

The oscillation gyro device 31, the resistors 11a and 11b, the DC power source 12, the voltage followers 20 and 21, the addition circuit 22, the phase shift circuit 23, the GCA 24, and the detection circuit 25 constitute a self-oscillating circuit.

Subsequently, the operation of the control circuit 50 will be described. The drive signal output from the GCA 24 is an AC voltage signal biased so as to have the DC voltage value Vref. The drive signal is input to the drive electrode 34a of the oscillation gyro device 31. Further, the common electrode 34d is biased by the DC power source 12 so as to have the DC voltage value Vref. Thus, the difference of the DC voltage value of the first surface of the piezoelectric film 33 and the DC voltage value of the second surface thereof is zero. The drive signal is converted to a mechanical movement in the piezoelectric film 33. Accordingly, the oscillation arm 132 performs the flexion movement in the Y direction.

The flexion movement is electrically converted in the piezoelectric film 33 and is output as detection signals by the first detection electrode 34b and the second detection electrode 34c. The two detection signals are AC voltage signals respectively biased by the resistors 11a and 11b so as to have the voltage value Vref. Each of the two detection signals has the frequency fo as shown in FIG. 3. In other words, in the case that the amplitude Ad of the drive signal is 1.1 Vp-p, the amplitude Ao of the detection signal is 0.75 Vp-p. The phase θo of the detection signal is advanced by 90 deg with respect to that of the drive signal.

The two detection signals are input to the voltage followers 20 and 21, respectively. The two detection signals are then input to the addition circuit 22 and to the differential amplifier circuit 26. In the case that the rotational angular velocity ωo is applied to the oscillation arm 132, the direction of the flexion movement changes owing to the Coriolis force generated in the X axis direction. As a result, a difference is caused between the value of the output detection signal of the first detection electrode 34b and the value of the output detection signal of the second detection electrode 34c. The difference of the output values is generated as a differential, so the output as the added value does not change. Meanwhile, the differential amplifier circuit 26 outputs a signal corresponding to a Coriolis force.

The phase of the output signal of the addition circuit 22 is advanced by 90 deg with respect to that of the drive signal. The phase of the output signal of the phase shift circuit 23 is the same as that of the drive signal. The output signal is amplified by the GCA 24 so as to have a constant voltage amplitude Ad of 1.1 Vp-p, and converted to a drive signal.

In this case, a voltage amplitude As of the output signal of the addition circuit 22 is monitored. The sharpness Qm of the oscillation arm 132 is thus monitored. As expressed in Equation (4), the oscillation amplitude Av of the oscillation arm 132 is in proportion with a value obtained by multiplying the voltage amplitude Ad of the drive signal by the sharpness Qm of the oscillation arm 132. Further, the voltage amplitude As of the output signal of the addition circuit 22 is obtained by piezoelectrically converting the oscillation amplitude Av. Thus, the voltage amplitude As is in proportion with the oscillation amplitude Av. In the case that a proportionality constant is represented by k4, the voltage amplitude As is expressed by Equation (6).

$$As = k4 * Av \quad (6)$$

Equation (7) is derived from the above Equations (4) and (6).

$$As = k3 * k4 * Ad * Qm \quad (7)$$

Since the voltage amplitude Ad of the drive signal has a constant value, as the voltage amplitude As of the output signal of the addition circuit 22 has a larger value, the sharpness Qm has a larger value and a detection sensitivity Sv is enhanced. By the monitoring of the voltage amplitude As, the result of the monitoring is accordingly reflected to the design of the oscillation gyro device 31 thereafter, the characteristics of the oscillation gyro device 31 are improved, and the detection sensitivity is enhanced.

Figure 5:
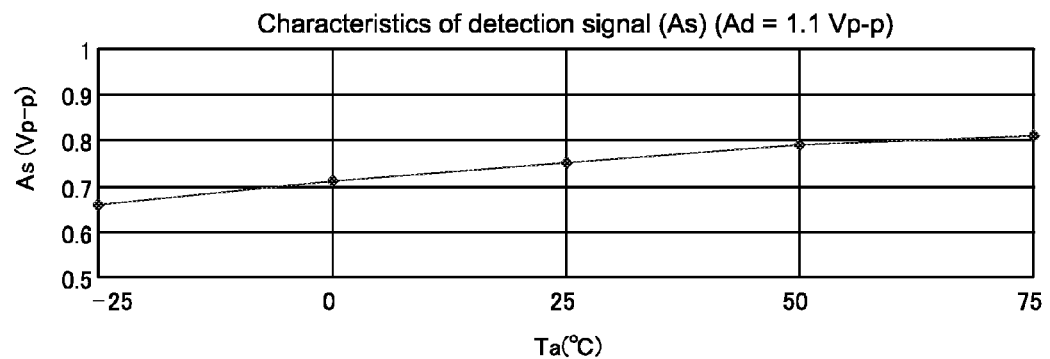
FIG. 5 is a graph showing characteristics of the oscillation type gyro sensor shown in FIG. 4.

FIG. 5 is a graph showing characteristics of the oscillation type gyro sensor 100 shown in FIG. 4. The voltage amplitude Ad of the drive signal is fixed to 1.1 Vp-p, and the voltage amplitude As of the output signal of the addition circuit 22 was measured. The abscissa axis represents temperature Ta in the vicinity of the oscillation type gyro sensor 100. As the temperature Ta increases, the voltage amplitude As increases, which shows that the sharpness Qm changes owing to the temperature.

Figure 6:
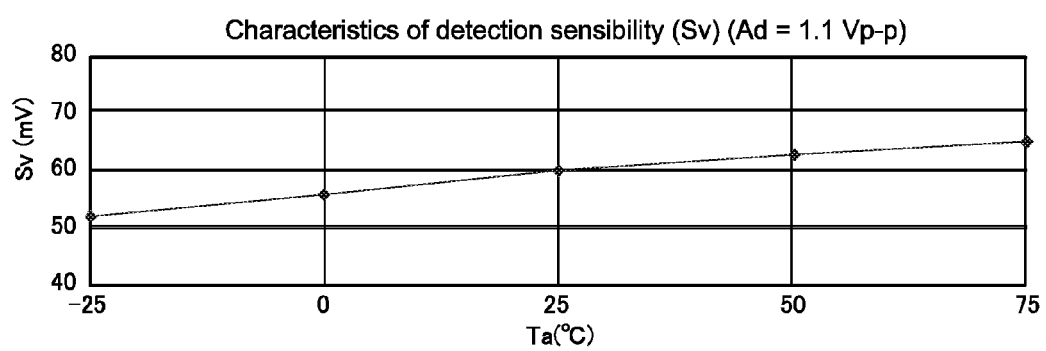
FIG. 6 is a graph showing sensitivity characteristics of the oscillation type gyro sensor shown in FIG. 4.

FIG. 6 is a graph showing sensitivity characteristics of the oscillation type gyro sensor 100 shown in FIG. 4. The graph shows the detection sensitivity in the case that the rotational angular velocity about the longitudinal axis of the oscillation arm 132 is applied to the oscillation arm 132. The abscissa axis represents the temperature Ta in the vicinity of the oscillation type gyro sensor 100. The detection sensitivity Sv is obtained as follows. That is, the differential signal Vo which is output from the differential amplifier circuit 26 is synchronously detected and DC-amplified. As the temperature Ta increases, the detection sensitivity Sv increases. It is clear from the graphs that the detection sensitivity Sv changes in proportion with the sharpness Qm.

Figure 7:
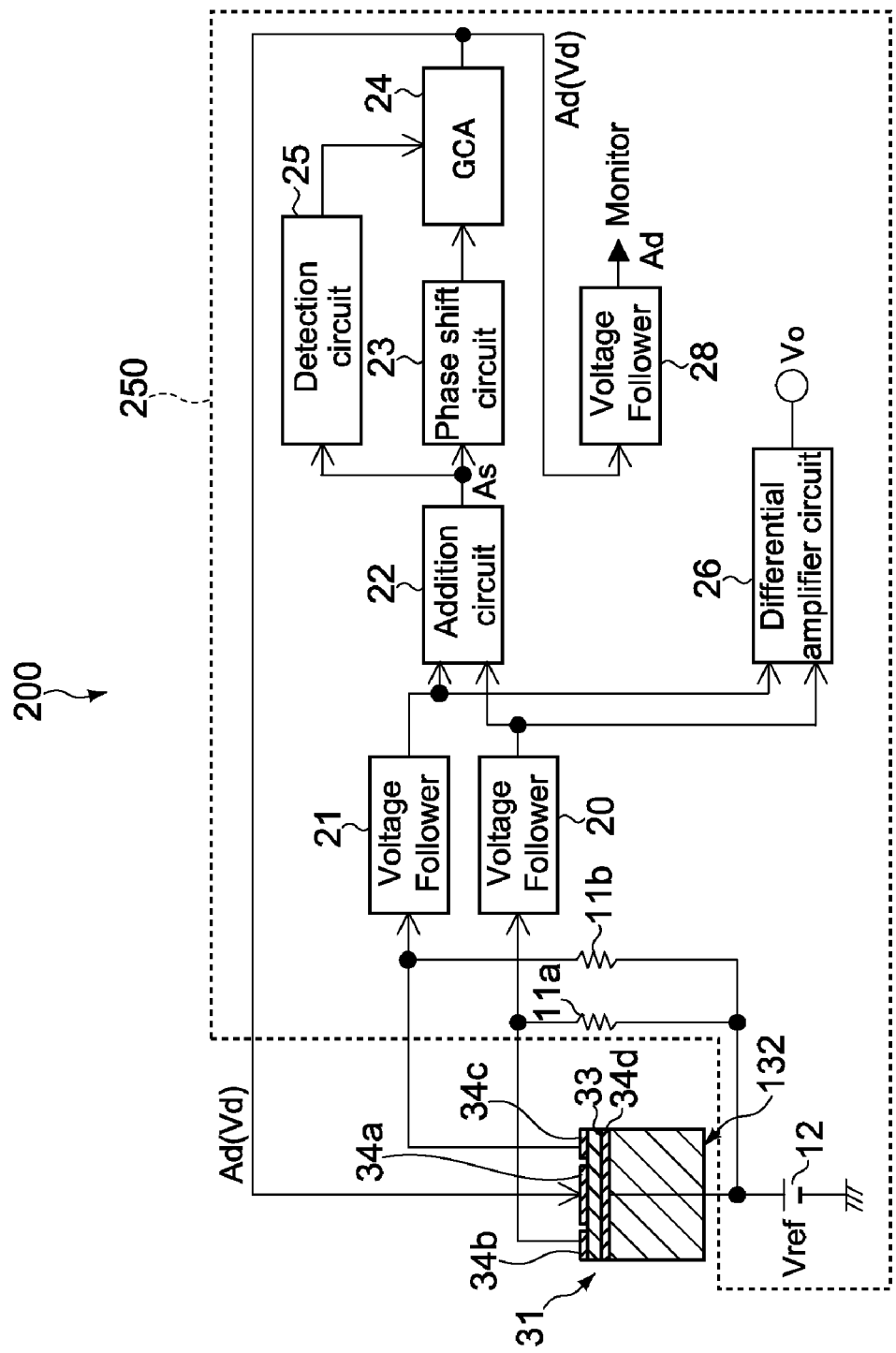
FIG. 7 is a block diagram showing a configuration of an oscillation type gyro sensor according to another embodiment of the present invention.

FIG. 7 is a block diagram showing a configuration of an oscillation type gyro sensor according to another embodiment of the present invention. With regard to the oscillation type gyro sensor, denoted by reference numeral 200, description of the configuration and functions similar to those of the oscillation type gyro sensor 100 shown in FIG. 4 will be simplified or omitted.

The oscillation type gyro sensor 200 includes the oscillation gyro device 31 as shown in FIG. 1A etc. and a control circuit 250 for driving the oscillation gyro device 31.

The output signal of the addition circuit 22 of the oscillation type gyro sensor 200 is input to the phase shift circuit 23 and to the detection circuit 25. The output signal of the phase shift circuit 23 and the output signal of the detection circuit 25 are input to the GCA 24. The output signal of the GCA 24 is input to the drive electrode 34a of the oscillation gyro device 31 and to a voltage follower 28. The voltage follower 28 serves as an impedance conversion circuit. Thus, as to be described later, in the case that the drive signal which is the output signal of the GCA 24 is monitored, an adverse effect on the piezoelectric film 33 can be prevented.

The detection circuit 25 detects the voltage amplitude of the output signal of the addition circuit 22. The GCA 24 feeds back the voltage amplitude detected by the detection circuit 25 such that the output signal of the addition circuit 22 has a constant voltage amplitude. The amplification degree is thus controlled. In other words, the GCA 24 and the detection circuit 25 constitute a controller.

The oscillation gyro device 31, the resistors 11a and 11b, the DC power source 12, the voltage followers 20 and 21, the addition circuit 22, the phase shift circuit 23, the GCA 24, and the detection circuit 25 constitute a self-oscillating circuit. In addition, the addition circuit 22, the phase shift circuit 23, and the GCA 24 constitute an oscillation circuit.

In this case, by the monitoring of the voltage amplitude which is the output signal of the voltage follower 28, the sharpness Qm of the oscillation arm 132 can be monitored. As expressed in Equation (7), the voltage amplitude As of the output signal of the addition circuit 22 has a constant value. Thus, as the voltage amplitude Ad of the drive signal has a smaller value, the sharpness Qm has a larger value and the detection sensitivity enhances.

For example, it is only necessary that when the oscillation type gyro sensor 200 is manufactured or prior to the shipment thereof, the drive signal output from the GCA 24 is monitored via the voltage follower 28. Since the drive signal is monitored, the optimum sharpness (Qm) value of the oscillation gyro device 31 can be observed. The sharpness Qm mainly depends on the characteristics of the piezoelectric film 33 of the oscillation gyro device 31, so the sharpness Qm becomes an index for improvement of the oscillation gyro device 31.

It is only necessary that the characteristics of the piezoelectric film 33 be improved, for example, such that, in the case that the voltage amplitude As of the output signal of the addition circuit 22 has a constant value, the voltage amplitude Ad of the drive signal has a smaller value or the voltage amplitude Ad has smaller temperature dependency. As a result, the same effect as that obtained when an output dynamic range of the control circuit 250 is increased can be obtained. In other words, since the voltage amplitude Ad can be made smaller, the output dynamic range of the control circuit 250 can be increased by that amount. By increasing the voltage amplitude As of the output signal of the addition circuit 22 by that amount, the detection sensitivity can be enhanced and S/N characteristics can be improved.

Further, the oscillation gyro device 31 includes the piezoelectric film 33. The thickness of a piezoelectric film is typically extremely thin as 0.1 to 5 μm. In the case that an electrode terminal (probe or the like for examination; not shown) for monitoring the drive signal is directly connected to an output terminal of the GCA 24, there is a fear that the piezoelectric film 33 may be damaged by electrostatic discharge or polarization fluctuates due to electric discharge. In the oscillation type gyro sensor 200 according to this embodiment, however, the probe or the like only needs to be connected to the output terminal of the GCA 24 via the voltage follower 28. So, the above-mentioned fear is eliminated.

Figure 8:
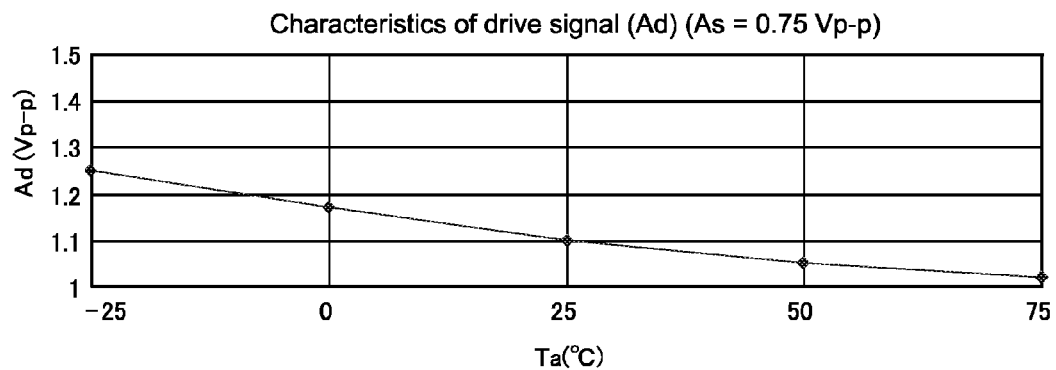
FIG. 8 is a graph showing characteristics of the oscillation type gyro sensor shown in FIG. 7.

FIG. 8 is a graph showing characteristics of the oscillation type gyro sensor 200 shown in FIG. 7. The voltage amplitude As of the output signal of the addition circuit 22 is fixed to 0.75 Vp-p, and the voltage amplitude Ad of the drive signal was measured. The abscissa axis represents temperature Ta in the vicinity of the oscillation type gyro sensor 200. As the temperature Ta increases, the voltage amplitude Ad decreases, which shows that the sharpness Qm changes owing to the temperature.

Figure 9:
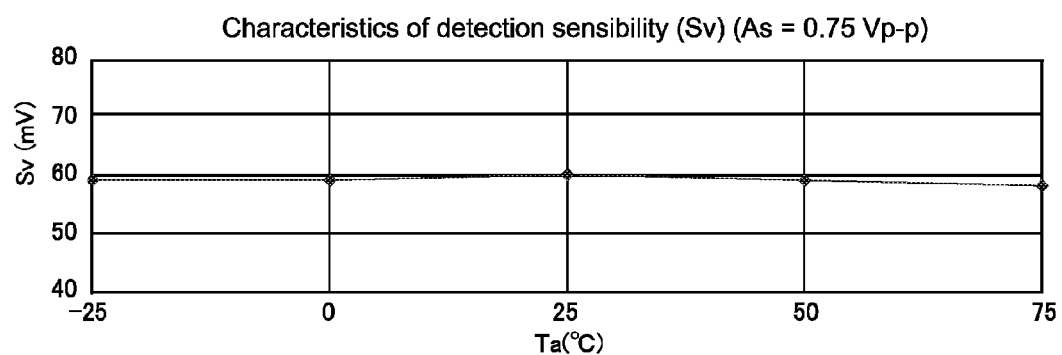
FIG. 9 is a graph showing sensitivity characteristics of the oscillation type gyro sensor shown in FIG. 7.

FIG. 9 is a graph showing sensitivity characteristics of the oscillation type gyro sensor 200 shown in FIG. 7. Similar to the graph of FIG. 6, the graph shows the detection sensitivity in the case that the rotational angular velocity about the longitudinal axis of the oscillation arm 132 is applied to the oscillation arm 132. As is apparent from the graph, the detection sensitivity Sv does not depend on the temperature Ta. Although the sharpness Qm changes depending on the temperature Ta, the voltage amplitude Ad of the drive signal changes so as to offset the dependency. The dependency of the detection sensitivity Sv on the temperature can be thus offset.

Figure 10A:
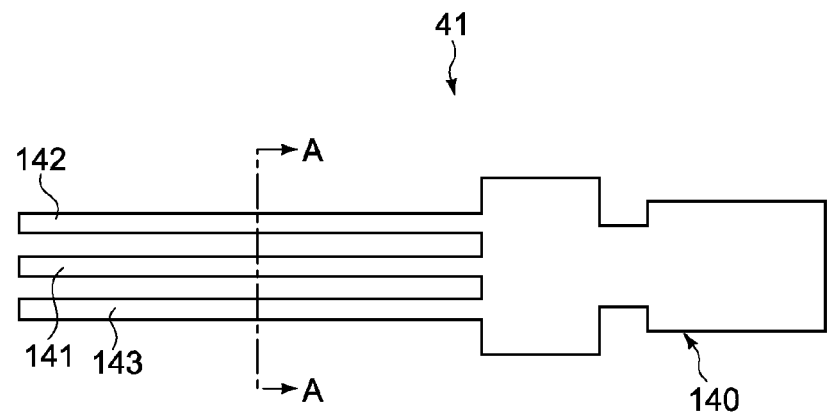
FIG. 10A is a diagram showing an oscillation gyro device according to another embodiment of the present invention.
Figure 10B:
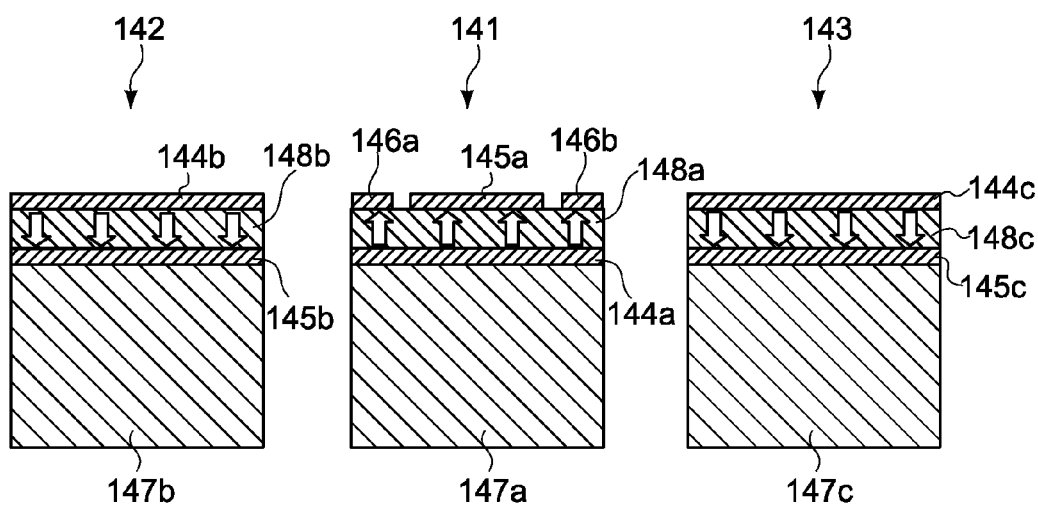
FIG. 10B is a cross-sectional view of the oscillation gyro device taken along the line A-A in FIG. 10A.

FIG. 10A is a diagram showing an oscillation gyro device according to another embodiment of the present invention. FIG. 10B is a cross-sectional view of the oscillation gyro device of FIG. 10A taken along the line A-A. In the following, the description of the components and functions similar to those of the oscillation gyro device 31 according to the embodiment described with reference to FIG. 1 and the oscillation type gyro sensor 200 shown in FIG. 7 will be simplified or omitted, and the components and functions different therefrom will be mainly described.

The oscillation gyro device, denoted by reference numeral 41, includes a base body 140 and three oscillation arms 141, 142, and 143 (first oscillation arm 141, second oscillation arm 142, and third oscillation arm 143) extending from the base body 140. The oscillation gyro device 41 is, for example, manufactured by the MEMS. As shown in FIG. 10B, the three oscillation arms 141, 142, and 143 include arm bases 147*a* to 147*c* made of silicon, respectively.

A piezoelectric film 148*a* is provided to the arm base 147*a* of the first oscillation arm 141 in the middle. A first drive electrode 145*a*, a first detection electrode 146*a*, and a second detection electrode 146*b* are provided to a first surface (upper surface) of the piezoelectric film 148*a*. Further, a common electrode 144*a* is provided to a second surface (lower surface) opposing the first surface of the piezoelectric film 148*a*.

A piezoelectric film 148*b* is provided to the arm base 147*b* of the second oscillation arm 142. A common electrode 144*b* is provided to a first surface of the piezoelectric film 148*b*. Further, a second drive electrode 145*b* is provided to a second surface of the piezoelectric film 148*b*. Similarly, a piezoelectric film 148*c* is provided to the arm base 147*c* of the third oscillation arm 143. A common electrode 144*c* is provided to a first surface of the piezoelectric film 148*c*. Further, a third drive electrode 145*c* is provided to a second surface of the piezoelectric film 148*c*.

The first drive electrode 145*a*, the piezoelectric film 148*a*, and the common electrode 144*a* constitute a first piezoelectric device. The second drive electrode 145*b*, the piezoelectric film 148*b*, and the common electrode 144*b* constitute a second piezoelectric device. The third drive electrode 145*c*, the piezoelectric film 148*c*, and the common electrode 144*c* constitute a third piezoelectric device.

The polarization direction in the piezoelectric film 148*b* is set to be the same as the polarization direction in the piezoelectric film 148*c*. Further, the polarization direction in the piezoelectric film 148*a* is inverted with respect to the polarization direction in each of the piezoelectric films 148*b* and 148*c*.

The base body 140 is, similar to the embodiment shown in FIG. 1, provided with a lead electrode (not shown).

Figure 11:
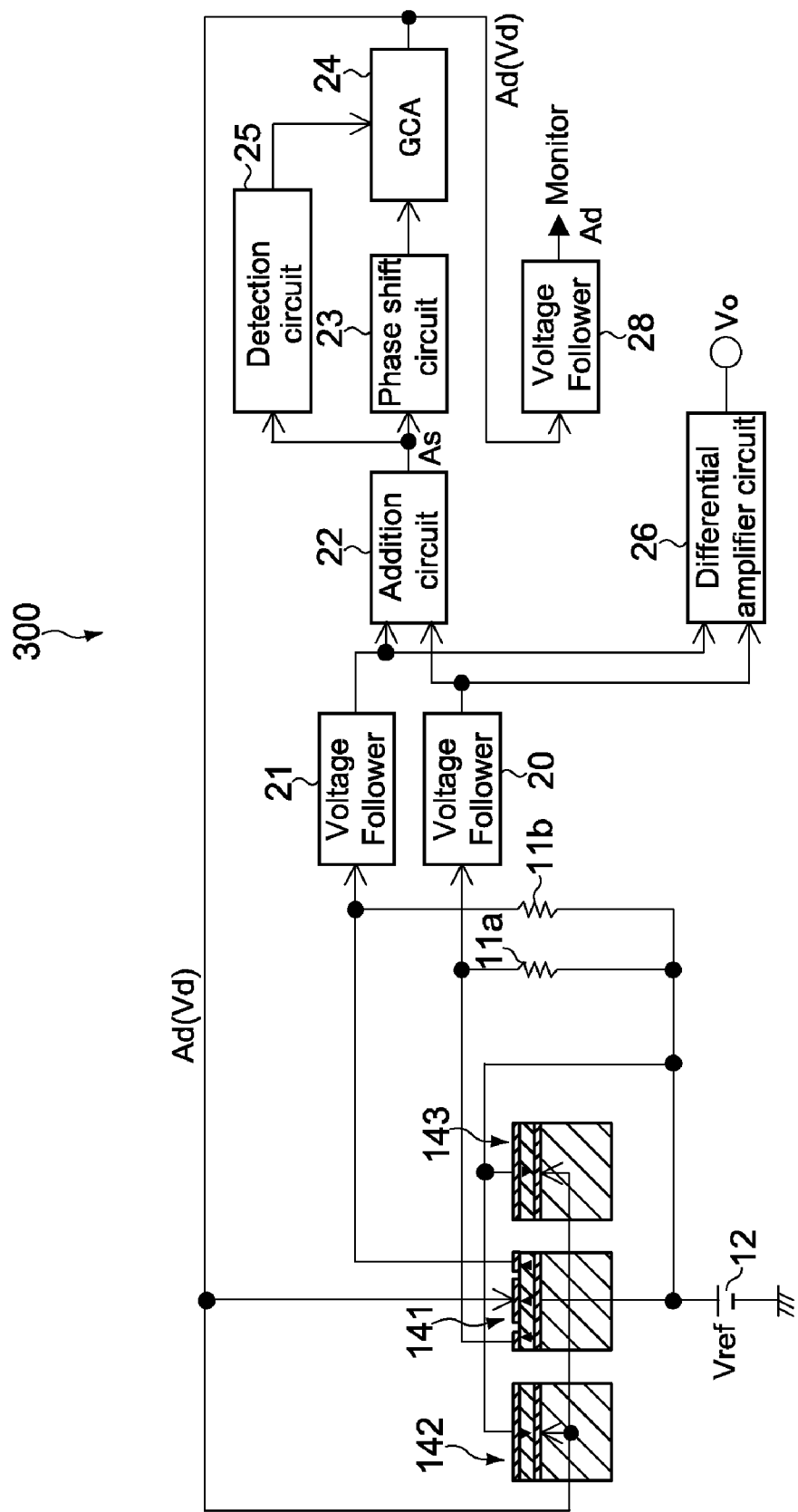
FIG. 11 is a block diagram showing a configuration of an oscillation type gyro sensor including the oscillation gyro device shown in FIG. 10A and FIG. 10B.

FIG. 11 is a block diagram showing a configuration of an oscillation type gyro sensor including the oscillation gyro device 41 shown in FIG. 10A and FIG. 10B.

The output signal of the GCA 24 of the oscillation type gyro sensor, denoted by reference numeral 300, is input to the first drive electrode 145*a*, the second drive electrode 145*b*, and the third drive electrode 145*c*. The common electrodes 144*a*, 144*b*, and 144*c* are biased by the DC power source 12 to the voltage value Vref.

The drive signal output from the GCA 24 is, in the same manner as the oscillation type gyro sensor 200 according to the above-mentioned embodiment, input to the voltage follower 28. The drive signal Ad output from the voltage follower 28 is monitored.

The oscillation type gyro sensor 300 configured as described above is caused to drive as follows. That is, the left and right oscillation arms 142 and 143 oscillate in the same phase and by the same amplitude. The oscillation arm 141 in the middle oscillates in the inverse phase as that of the left and right oscillation arms 142 and 143 and by twice the amplitude.

The oscillation type gyro sensor 300 of this embodiment has, as described above, the effect similar to that of the oscillation type gyro sensor 200.

It should be noted that the drive signal does not need to be input to the second drive electrode 145*b* and the third drive electrode 145*c*. In this case, the left and right oscillation arms 142 and 143 oscillate in reaction to the oscillation of the oscillation arm 141 in the middle.

Figure 12:
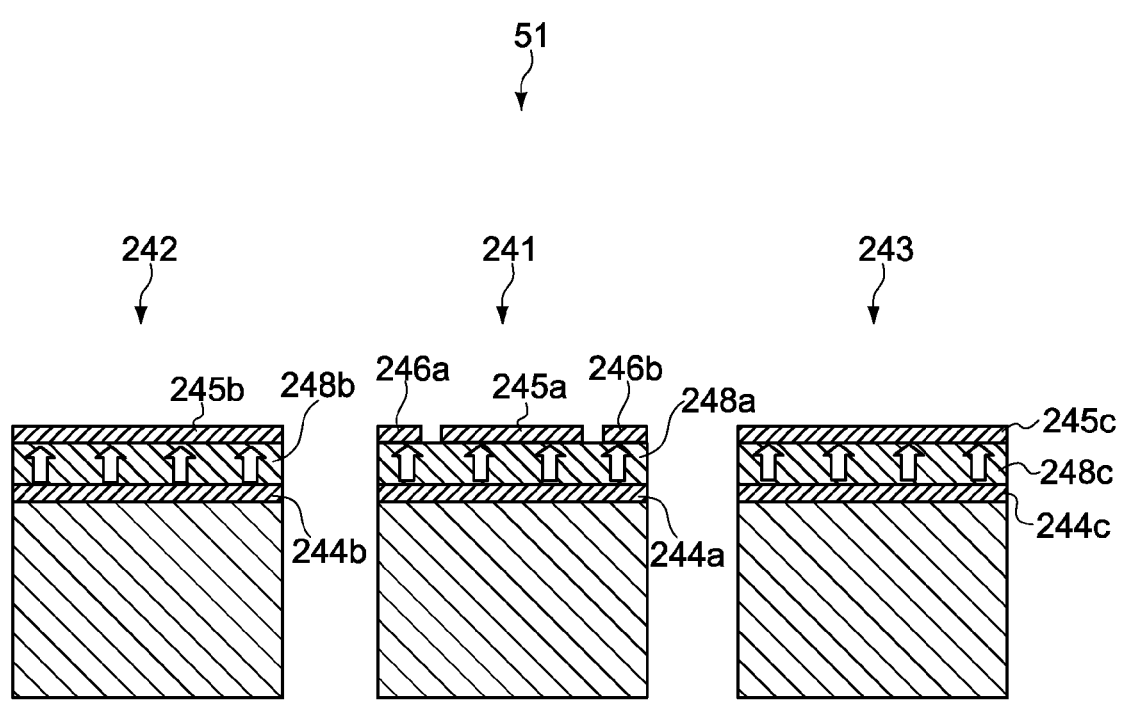
FIG. 12 is a cross-sectional view of an oscillation gyro device according to another embodiment of the present invention.

FIG. 12 is a cross-sectional view of an oscillation gyro device according to another embodiment of the present invention. The oscillation gyro device, denoted by reference numeral 51, is the same as the oscillation gyro device 41 shown in FIG. 10A in a plan view. The oscillation gyro device 51 is different from the oscillation gyro device 41 in that the polarization directions in piezoelectric films 248a, 248b, and 248c are all the same.

A drive electrode 245a is provided to a first surface (upper surface) of the piezoelectric film 248a. A common electrode 244a is provided to a second surface (lower surface) of the piezoelectric film 248a. A first detection electrode 246a and a second detection electrode 246b are also provided to the first surface of the piezoelectric film 248a. A drive electrode 245b is provided to a first surface of the piezoelectric film 248b. A common electrode 244b is provided to a second surface of the piezoelectric film 248b. A drive electrode 245c is provided to a first surface of the piezoelectric film 248c. A common electrode 244c is provided to a second surface of the piezoelectric film 248c.

Figure 13:
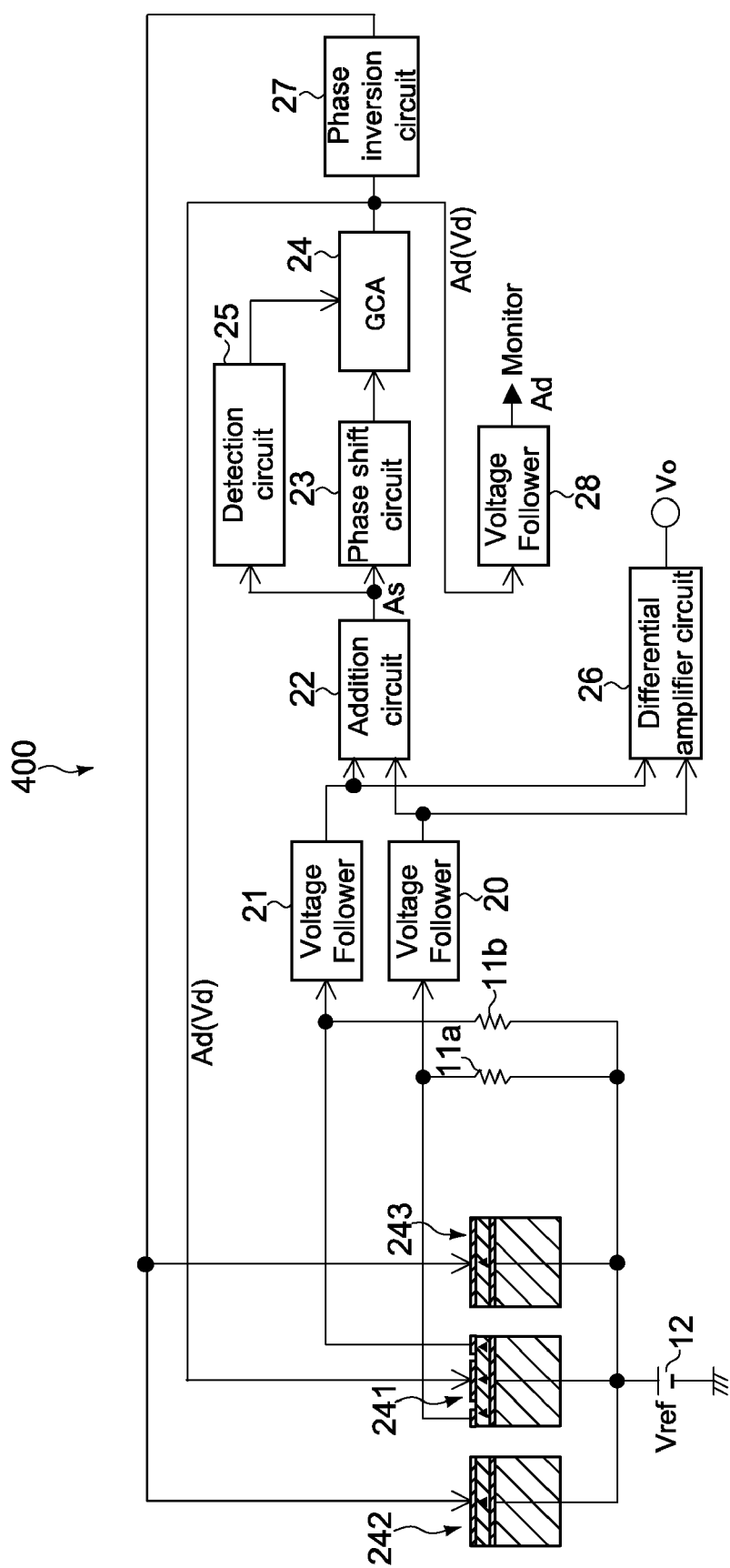
FIG. 13 is a block diagram showing a configuration of an oscillation type gyro sensor including the oscillation gyro device shown in FIG. 12.

FIG. 13 is a block diagram showing a configuration of an oscillation type gyro sensor including the oscillation gyro device 51.

The oscillation type gyro sensor, denoted by reference numeral 400, includes a phase inversion circuit 27 for inverting the phase of the drive signal output from the GCA 24. In addition, the drive signal Ad output from the GCA 24 is input to the voltage follower 28.

The drive signal Ad output from the GCA 24 is also input to the first drive electrode 245a. The drive electrode inverted by the phase inversion circuit 27 is input to the second drive electrode 245b and the third drive electrode 245c. Owing to such a configuration, even when the polarization directions of the piezoelectric films 248a, 248b, and 248c are all the same, the oscillation of the first oscillation arm 241 and the oscillation of the second oscillation arm 242 and the third oscillation arm 243 are inversed in phase. In other words, the oscillation arms 241 to 243 oscillate in the same phases as those of the oscillation arms 141 to 143 of the oscillation type gyro sensor 300, respectively.

The oscillation type gyro sensor 400 of this embodiment has the effect similar to those of the above-mentioned oscillation type gyro sensors 200 and 300.

Figure 14:
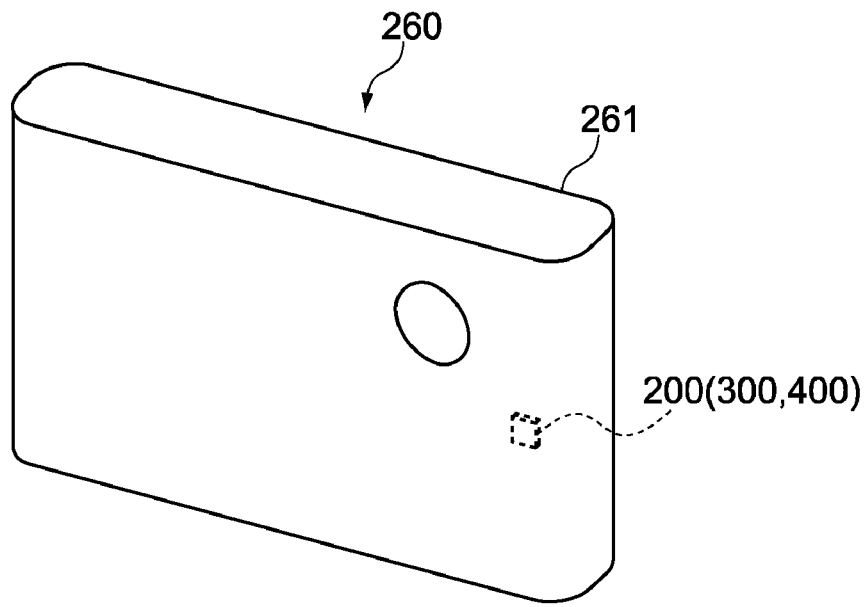
FIG. 14 is a perspective view schematically showing a digital camera as an example of an electronic apparatus mounted with one of the above oscillation type gyro sensors.
Figure 15:
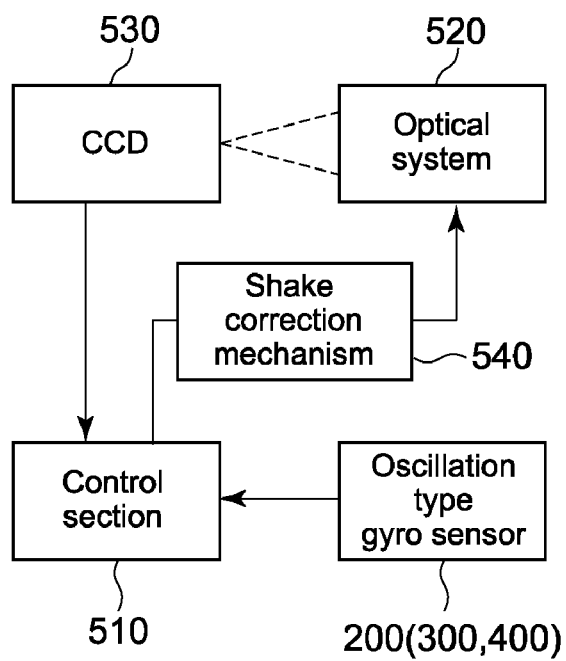
FIG. 15 is a block diagram illustrating a configuration of the digital camera.

FIG. 14 is a perspective view schematically showing a digital camera as an example of an electronic apparatus mounted with one of the above oscillation type gyro sensors 200, 300, and 400. FIG. 15 is a block diagram illustrating a configuration of the digital camera.

The digital camera, denoted by reference numeral 260, includes an apparatus main body 261 mounted with the oscillation type gyro sensor 200 (300, 400). The apparatus main body 261 is a frame or a casing made of a metal, a resin, or the like. The oscillation type gyro sensor 200 (300, 400) is packaged in a size of a few millimeters square. One oscillation type gyro sensor 200 (300, 400) is mounted with at least two oscillation gyro devices 31 (41, 51) (refer to FIG. 1, FIG. 10, or FIG. 12) in order to detect rotational angular velocity about at least two axes.

As shown in FIG. 15, the digital camera 260 includes the oscillation type gyro sensor 200 (300, 400), a control section 510, an optical system 520 including a lens, a CCD 530, and a shake correction mechanism 540. The shake correction mechanism 540 executes shake correction with respect to the optical system 520.

The oscillation type gyro sensor 200 (300, 400) detects a biaxial Coriolis force. The control section 510 controls the shake correction mechanism 540 to execute the shake correction with respect to the optical system 520 based on the detected Coriolis force.

Embodiments of the present invention are not limited to the embodiments described above. It should be understood by those skilled in the art that various modifications, combinations, sub-combinations and alternations may occur depending on design requirements and other factors insofar as they are within the scope of the appended claims or the equivalents thereof.

For example, the shape, size, material, and so forth of the substrate, wirings, oscillation arm, base body, and so forth that constitute the oscillation gyro devices 31, 41, and 51 can be changed as appropriate.

The electronic apparatus mounted with the oscillation type gyro sensor 200 (300, 400) according to the embodiments of the present invention is not limited to the digital camera as described above. For example, as an electronic apparatus, there can be employed a lap-top personal computer, a PDA (Personal Digital Assistance), an electronic dictionary, AV equipment, a projector, a mobile phone, a game apparatus, a car-navigation apparatus, a robot apparatus, and other electronic appliances.

What is claimed is:

1. An oscillation type gyro sensor, comprising:
an oscillation gyro device including a piezoelectric device including a drive electrode and a detection electrode, the oscillation gyro device oscillating according to a drive signal input to the drive electrode and capable of generating an output signal including a detection signal corresponding to a Coriolis force from the detection electrode;
an oscillation circuit outputting, based on the output signal, the drive signal to the drive electrode for oscillating the oscillation gyro device;
a controller controlling the oscillation circuit such that the oscillation circuit outputs the drive signal that makes the output signal constant, the oscillation circuit and the controller including a gain control amplifier outputting the drive signal to the drive electrode; and
an impedance conversion circuit connected to an output terminal of the gain control amplifier so as to monitor the drive signal via the impedance conversion circuit.

2. The oscillation type gyro sensor as set forth in claim 1, wherein the detection electrode includes a first detection electrode generating a first signal and a second detection electrode generating a second signal, a difference of the first signal and the second signal being used to obtain the detection signal,
wherein the oscillation type gyro sensor further comprises an addition circuit adding the first signal from the first detection electrode and the second signal from the second detection electrode, and
wherein the oscillation circuit outputs, based on a signal obtained by the addition in the addition circuit, the drive signal to the drive electrode.

3. The oscillation type gyro sensor as set forth in claim 1, wherein the oscillation gyro device includes an oscillation arm mounted with the piezoelectric device, and a base body including a lead electrode group connecting the drive electrode and the detection electrode to an outside of the oscillation type gyro sensor and supporting the oscillation arm.

4. The oscillation type gyro sensor as set forth in claim 3, wherein the piezoelectric device includes a piezoelectric film having a first surface on which the drive electrode and the detection electrode are formed and a second surface on a side opposite to the first surface, a common electrode formed on the second surface, and wherein the oscillation arm includes an arm base made of a semiconductor, the arm base mounted with the piezoelectric device such that the common electrode is provided between the arm base and the piezoelectric film.

5. An oscillation type gyro sensor, comprising:

an oscillation gyro device including a first oscillation arm including a first piezoelectric device having a first drive electrode and detection electrodes, a second oscillation arm including a second piezoelectric device having a second drive electrode, and a third oscillation arm including a third piezoelectric device having a third drive electrode, the oscillation gyro device oscillating according to a drive signal input to each of the first drive electrode, the second drive electrode, and the third drive electrode and capable of generating an output signal including a detection signal corresponding to a Coriolis force from the detection electrodes;

an oscillation circuit outputting, based on the output signal, the drive signal to each of the first drive electrode, the second drive electrode, and the third drive electrode for oscillating the oscillation gyro device;

a controller controlling the oscillation circuit such that the oscillation circuit outputs the drive signal that makes the output signal constant, the oscillation circuit and the controller including a gain control amplifier outputting the drive signal to each of the first drive electrode, the second drive electrode, and the third drive electrode; and an impedance conversion circuit connected to an output terminal of the gain control amplifier so as to monitor the drive signal via the impedance conversion circuit.

6. A control circuit for an oscillation type gyro sensor including an oscillation gyro device that includes a piezoelectric device having a drive electrode and a detection electrode, the oscillation gyro device oscillating according to a drive signal input to the drive electrode and capable of generating an output signal including a detection signal corresponding to a Coriolis force from the detection electrode, comprising:

an oscillation circuit outputting, based on the output signal, the drive signal to the drive electrode for oscillating the oscillation gyro device;

a controller controlling the oscillation circuit such that the oscillation circuit outputs the drive signal that makes the output signal constant, the oscillation circuit and the controller including a gain control amplifier outputting the drive signal to the drive electrode; and an impedance conversion circuit connected to an output terminal of the gain control amplifier so as to monitor the drive signal via the impedance conversion circuit.

7. An electronic apparatus, comprising:

a case; and an oscillation type gyro sensor mounted inside the case and including an oscillation gyro device including a piezoelectric member, a drive electrode driving the piezoelectric member, and a detection electrode outputting, when a Coriolis force is generated in the piezoelectric member, an output signal including a detection signal corresponding to the Coriolis force, an oscillation circuit outputting, based on the output signal, a drive signal to the drive electrode for oscillating the oscillation gyro device, a controller controlling the oscillation circuit such that the oscillation circuit outputs the drive signal that makes the output signal constant, the oscillation circuit and the controller including a gain control amplifier outputting the drive signal to the drive electrode, and an impedance conversion circuit connected to an output terminal of the gain control amplifier so as to monitor the drive signal via the impedance conversion circuit.

8. A manufacturing method for an oscillation type gyro sensor including an oscillation gyro device that includes a piezoelectric device having a drive electrode and a detection electrode, the oscillation gyro device oscillating according to a drive signal input to the drive electrode and capable of generating an output signal including a detection signal corresponding to a Coriolis force from the detection electrode, comprising:

electrically connecting a control circuit and the oscillation gyro device, the control circuit including an oscillation circuit outputting, based on the output signal, the drive signal to the drive electrode for oscillating the oscillation gyro device, a controller controlling the oscillation circuit such that the oscillation circuit outputs the drive signal that makes the output signal constant, the oscillation circuit and the controller including a gain control amplifier outputting the drive signal to the drive electrode, and an impedance conversion circuit connected to an output terminal of the gain control amplifier so as to monitor the drive signal via the impedance conversion circuit;

outputting the drive signal from the oscillation circuit of the control circuit to drive the oscillation gyro device; and monitoring the drive signal output from the impedance conversion circuit of the control circuit.

* * * * *